July 16, 1968  J. W. PEASE  3,392,621
TUNER FOR STRINGED INSTRUMENTS
Filed Nov. 13, 1967  3 Sheets-Sheet 1

John W. Pease
INVENTOR.

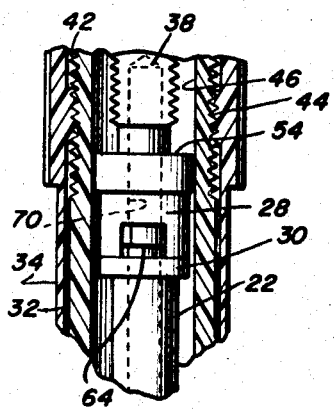
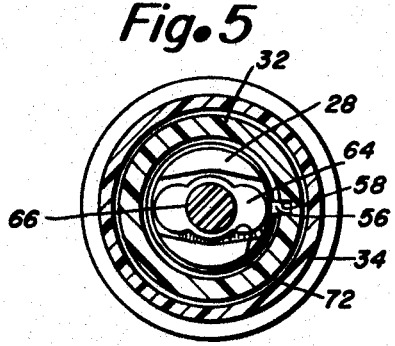
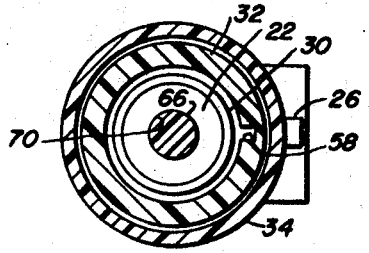
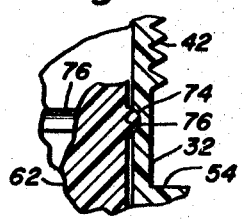
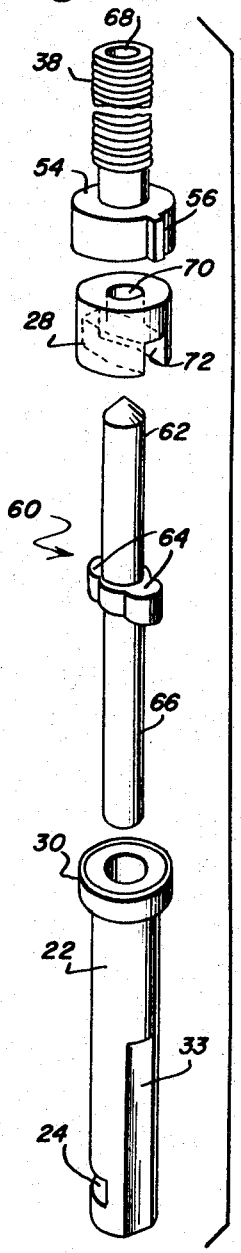

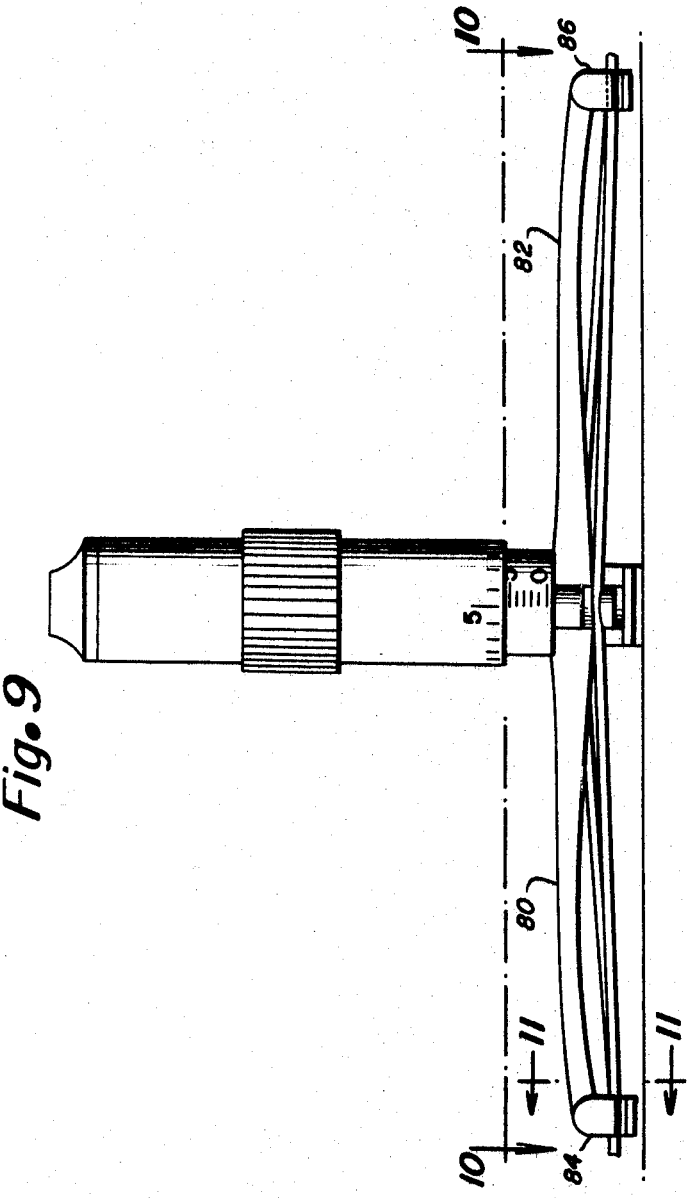
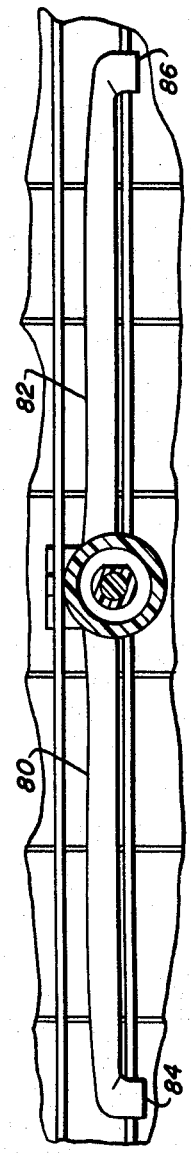
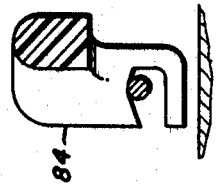
John W. Pease
INVENTOR.

United States Patent Office 3,392,621
Patented July 16, 1968

3,392,621
TUNER FOR STRINGED INSTRUMENTS
John W. Pease, 1730 Winchester Drive,
Winter Park, Fla. 32789
Continuation-in-part of application Ser. No. 558,136,
June 16, 1966. This application Nov. 13, 1967, Ser.
No. 682,109
4 Claims. (Cl. 84—454)

ABSTRACT OF THE DISCLOSURE

The invention comprises an improved mechanical type tuner for stringed instruments wherein differential screw means and associated scales are provided to effect a required fine adjustment of deflection of a string while at the same time providing a reasonably readable scale indicating the value of deflection effected and wherein improved compact minimum friction guide means provided in the form of a shaft is slidably fitted to the hollow interior of a force transmitting means of the tuner.

---

Figure 1:
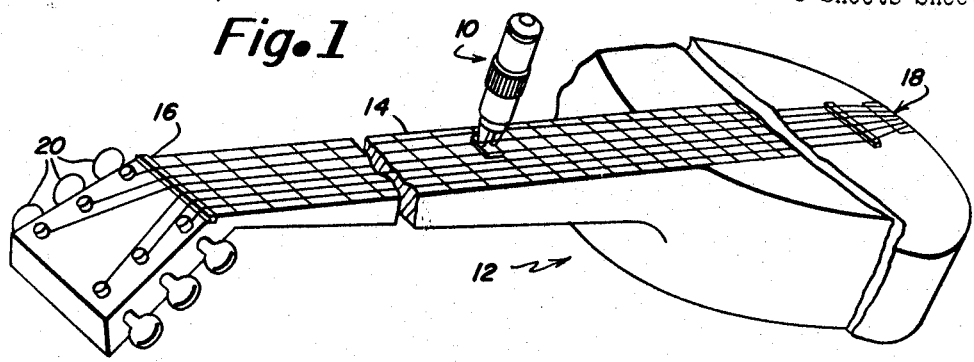

This application is a continuation-in-part of my earlier copending applications, Ser. No. 472,597, filed July 16, 1965, and Ser. No. 558,136, filed June 16, 1966.

Background of the invention

The invention relates to the field of musical instruments and particularly to that segment relating to devices for tuning stringed instruments by a mechanical setting of string tension.

It has been known in the arts of well drilling and in elevator cable testing and the like to measure and adjust the tension in a cable by the selective adjustment of force and tension. In my prior pending U.S. patent applications identified above, there has been disclosed apparatus and method for the establishment of pitch in a string by a device adjustable in force and/or deflection, and adapted to a snap or breakaway action for indication of proper pitch, responsive to a progressive tightening of a string to be tuned.

Summary of the invention

The subject invention is directed to improvements over applicant's prior teachings by way of the combining and incorporating in limited space of a differential screw mechanism and associated scales to provide increased deflection sensitivity adjustment while at the same time maintaining a legible scale marking, indicating adjusted position of deflection. Also incorporated into the differential screw train of mechanism is an improved guide means for a non-rotatable force transmitting member employed as a string lifter for deflection of a string.

Other objects and advantages will appear from the following description of an example of the invention, when considered in connection with the accompanying drawing, and the novel features will be particularly pointed out in the appended claims.

In the drawings

Figure 3:
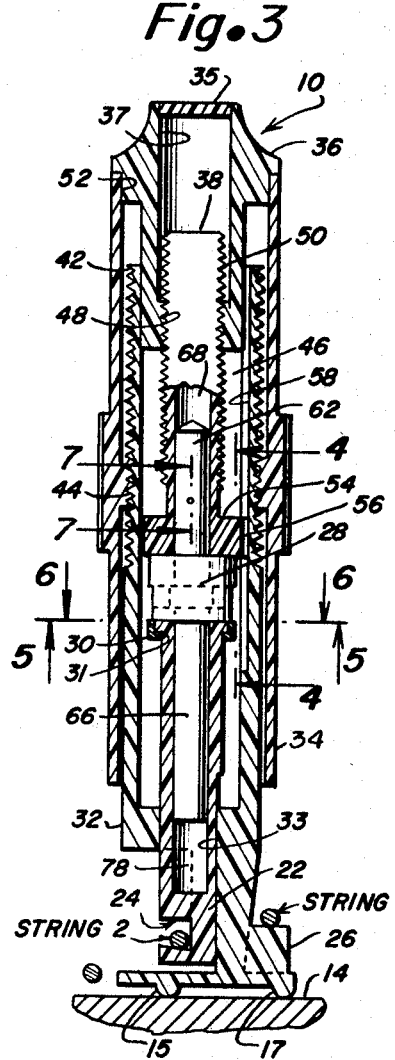
Figure 2:
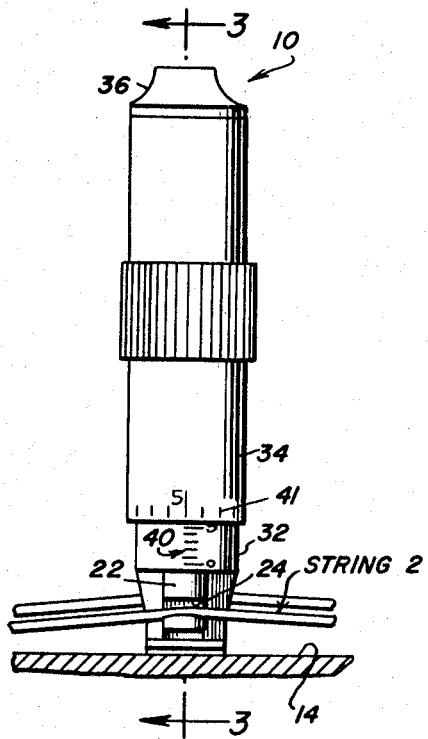

FIG. 1 is a perspective view showing a tuner incorporating the invention applied in tuning position on an instrument to be tuned, FIG. 2 is an enlarged frontal elevational view of the tuner shown in FIG. 1, showing further details of the tuner including the deflection scales and attachment of a string to the force transmitting member of the tuner, FIG. 3 is a still further enlarged cross-sectional view taken on line 3—3 of FIG. 2, FIG. 4 is a cross-sectional view taken on line 4—4 of FIG. 3, FIG. 5 is an enlarged cross-sectional view taken on line 5—5 of FIG. 3, FIG. 6 is an enlarged cross-sectional view taken on line 6—6 of FIG. 3, FIG. 7 is an enlarged sectional view taken on line 7—7 of FIG. 3, showing in cross-section a rib and groove snap-in connection of a fastener in a threaded connector, shown in assembled condition in FIG. 3, FIG. 8 is an exploded view showing in perspective several of the tuner parts shown in assembled form in FIG. 3, FIGS. 9, 10, and 11 show the same tuner as in FIGS. 1–8 except with a modified foot arrangement for connecting the tuner to a stringed instrument, FIG. 9 shows the modified tuner in elevation, FIG. 10 is a plan view partly in cross-section, taken on line 10—10 of FIG. 9, and FIG. 11 is an enlarged view of a portion of the modified foot, taken on line 11—11 of FIG. 9.

Description of the preferred embodiment

Referring to FIG. 1 of the drawing, a tuner 10 incorporating the invention is shown resting on the neck 14 of a stringed musical instrument 12. The stringed instrument shown for purposes of describing the invention is the conventional six string guitar wherein each string is suspended across spaced portions of the guitar, namely the nut 16 and bridge 18, and wherein the string is tightened by means of a tuning peg, as for example peg 20. In FIG. 1, the tuner 10 is in position to tune string #2, the tension in which is adjusted by the tuning peg 20. As shown in FIG. 2, the string to be tuned is passed through a slot 24 formed in a force transmitting member 22. The next adjacent string #1 is placed to rest on a fin 26 (see FIG. 3) of the tuner to aid in holding the tuner in position on the instrument 12.

The tuner as thus far described follows the teachings of my copending U.S. application Ser. No. 558,136, filed June 16, 1966.

In accordance with the present invention, there is provided improvement by way of a differential screw arrangement and associated scales to improve the sensitivity of deflection adjustment while maintaining legibility of scale reading. Thus, as shown in FIG. 3, there is provided a pair of magnetic elements 28 and 30 housed in a pair of hollow cylinders 32 and 34 and supported by connectors 36 and 38 operatively connected with the cylinders 32 and 34 to form a differential screw connection means. The resulting differential screw connection means operates to provide a relatively small magnetic element displacement in said cylinders for a relatively large linear displacement of cylinder 34 with respect to cylinder 32, as will be described in detail hereinafter, and such that the scale divisions of a linear scale 40 on the inner cylinder 32 may be spaced far enough apart for reasonable legibility.

The inner cylinder 32 and outer cylinder 34 are formed respectively with outer threads 42 and inner threads 44 for telescopically threading together as shown. Threads 42 and 44 are relatively coarse threads of say 20 threads per inch, and scale 40 formed on inner cylinder 32 is formed of the same number of divisions per inch.

Magnetic element 28 is supported adjustably along the length of the hollow interior 46 of cylinder 32 by the pair of threaded connectors 36 and 38 inter-connected by relatively fine threads 48 and 50 as shown of say 32 threads per inch. Connector 36 is centrally recessed as at 37 to pass the free end of connector 38 and formed with an annulus 52 for press fit of connector 36 in cylinder 34 to rotate therewith. A plug 35 is press fit to close the end of recess 37. The opposite end of connector 38 is flanged as at 54 and formed with a rib as at 56. Rib 56 is slidably received in a groove 58 formed in the inner periphery of cylinder 32 to provide slidable non-rotational connection of cylinder 32 and connector 38.

To secure the magnetic element 28 to the connector 38 and at the same time provide a guide for the force transmitting member 22, the connector 38 is provided with a fastener 60 (see FIG. 8) having a first projecting shaft 62, a flanged portion 64 and a second oppositely projecting shaft 66. Connector 38 is centrally apertured as at 68 to receive the shaft 62. Magnetic element 28 is apertured as at 70 and recessed as at 72 to receive the shaft 62 and flange 64. Shaft 62 can be dimensioned for press fit in the connector 38 or other securing provision made. At present it is preferred to provide a slight annulus 74 on the shaft 62 (see FIG. 7) and a slight groove 76 in the connector 38 to snap fit shaft 62 in connector 38. The one magnetic element 28 is thus secured to the connector 38 by the fastener 60.

The other magnetic element 30 (see FIGS. 8 and 3) is made in the form of a stepped face annulus having a central aperture 31 and is press fit on the force transmitting member 22 as shown in FIG. 8. The second shaft 66 integral with fastener 60 is slidably received in the central passage 78 of the force transmitting member 22 and provides means guiding the movement of the force transmitting member 22 in the inner cylindrical housing 32 to maintain the magnetic elements 28 and 30 in alignment for engagement with each other. By this arrangement, a minimum of guiding surface is employed, thereby effecting a minimum of friction in the guiding of the member 22. The arrangement is also compact and adapted to minimum cost manufacturing methods. FIGS. 4, 5, and 6 present detailed cross-sections of the assembled parts.

As shown in FIG. 8, the force transmitting member 22 is formed with a flat surface 23 and the inner cylindrical housing 32 is formed with a complementary flat surface 33 (see FIG. 3) to prevent rotation of the force transmitting member 22 and thus maintain its string slot 24 outwardly directed to receive the string to be tuned. A peripheral scale 41 of 25 equal divisions is marked on the outer cylinder 34 to set the tuner for degrees of partial turn of the outer cylinder 34.

As shown in FIG. 3, the foot of the inner cylinder 32 is provided with spaced ribs 15 and 17 parallel to each other and to the slot 24 through which a string to be tuned is passed. With this arrangement, the tuner will set firmly and stable on a curved instrument neck as well as on an instrument having a flat neck surface.

*Operation*

In operation, the tuner is set to a particular scale setting of scales 40 and 41 and the string being adjusted for pitch is tightened until the force transmitting member 22 and the string carried thereby snap downward. The string pitch obtained is dependent upon the scale settings. Raising scale settings lowers the string pitch and reducing scale settings raises the string pitch.

As previously described herein, for each complete turn of the outer cylinder 34 the force transmitting member 22 is moved by the differential of the two sets of threads provided, in other words a very small amount, and yet the lower skirt of the outer cylinder is raised the linear distance of the coarse thread connecting the two cylinders 32 and 34, i.e., a relatively large amount and quite legible.

It is to be noted that the member 22 is guided solely by the shaft 66. No guide support is required or desired of the inner cylinder 32. The object here is to maintain minimum friction. With the exception of the magnetic elements, it is presently preferred to make all the parts of the tuner of a low static friction plastic such as Delrin or Selcon.

*Modification*

In FIGS. 1-8 a preferred embodiment of the invention was shown and described in which a C-shaped foot is employed on the inner cylinder as a portion engageable with the instrument to fix the position of the tuner in relation to the string to be tuned. The C-shaped foot means is satisfactory where the instrument has a portion, as for example a neck, upon which the foot can rest. However, for other instruments, as for example the harp, a different foot means as shown in FIGS. 9, 10, and 11 is provided.

Referring to FIGS. 9 to 11, the foot here shown is of the spread anvil type in which the foot engages the instrument by engaging the string at spaced points therealong to fix the position of the tuner in relation to the string. Thus, as shown in FIG. 9, the inner cylinder 32 is formed with laterally projecting arms 80 and 82 terminating respectively in anvils 84 and 86 engaging spaced portions of the string #2 indicated. The force transmitting member 22 accepts the string #2 in its slot 24 and deflects the string in a direction urging the string into engagement with the anvils 84 and 86.

It will be understood that various changes in the details, materials, and arrangements of parts, which have been herein described and illustrated in order to explain the nature of the invention, may be made by those skilled in the art within the principle and scope of the invention as expressed in the appended claims.

For example, while I presently prefer to make the body of the force transmitting member of plastic and to form a stepped annulus of metal for an end of the force transmitting member constituting the second of the two magnetic elements, it is quite obvious that all of the force transmitting member including it magnetic element end could be one integral piece of metal.

It is claimed:

1. A tuner for stringed musical instruments of the type having an instrument body, means suspending a string from two spaced portions of said body in normal substantially straight line condition, and means for adjustably varying the tension in said string to provide a desired pitch therein, said tuner comprising:
   (a) a pair of magnetic elements;
   (b) inner and outer hollow cylinders interconnected through a set of relatively coarse threads;
   (c) a pair of threaded connectors connecting said one magnetic element to said outer cylinders through a relatively fine set of threads;
   (d) one of said connectors and said inner cylinder being formed one with a groove and the other with a rib to prevent rotation of said one connector and form a differenital screw connection means between said inner cylinder and said one magnetic element;
   (e) the outer periphery of said inner and outer cylinders being marked respectively with linear and peripherial scales to indicate by turn and part turn the adjusted position of said one magnetic element;
   (f) said inner cylinder having a portion engageable with said instrument to fix the position of said tuner in relation to said string;
   (g) an elongated force transmitting member positioned in said inner cylinder, said member having one end constituting the other end of said magnetic elements and its opposite end shaped to engage and deflect said string; and
   (h) means guiding the movement of said force transmitting member in said housing to maintain said magnetic elements in alignment for engagement with each other.

2. A tuner according to claim 1 including:
   (a) said one connector including a fastener having a flanged portion and a projecting shaft, and
   (b) said one magnetic element and said one connector each being centrally apertured to receive said fastener shaft to fix said magnetic element to said connector.

3. A tuner according to claim 2:
   (a) said guiding means including a second shaft integral with said fastener and oppositely directed from said first shaft, and
(b) said force transmitting member having a central longitudinal passageway to slidably receive said second shaft.
4. A tuner according to claim 3:
(a) said force transmitting member and said inner housing being formed with adjacent flat surfaces to prevent rotation of said member in said housing.

References Cited

UNITED STATES PATENTS 3,174,334   3/1965   McKernan _____ 73—144

RICHARD B. WILKINSON, *Primary Examiner.*

L. R. FRANKLIN, *Assistant Examiner.*